(12) United States Patent
Choi

(10) Patent No.: US 10,454,083 B2
(45) Date of Patent: Oct. 22, 2019

(54) BATTERY MODULE

(71) Applicant: LG CHEM, LTD., Seoul (KR)

(72) Inventor: Jung-Seok Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 60 days.

(21) Appl. No.: 15/571,932

(22) PCT Filed: Oct. 4, 2016

(86) PCT No.: PCT/KR2016/011076
§ 371 (c)(1),
(2) Date: Nov. 6, 2017

(87) PCT Pub. No.: WO2017/061746
PCT Pub. Date: Apr. 13, 2017

(65) Prior Publication Data
US 2018/0138472 A1    May 17, 2018

(30) Foreign Application Priority Data

Oct. 8, 2015  (KR) .......................... 10-2015-0141756

(51) Int. Cl.
*H01M 10/613*       (2014.01)
*H01M 10/6552*      (2014.01)
(Continued)

(52) U.S. Cl.
CPC .......... *H01M 2/1077* (2013.01); *H01M 2/02* (2013.01); *H01M 2/021* (2013.01);
(Continued)

(58) Field of Classification Search
None
See application file for complete search history.

(56) References Cited

U.S. PATENT DOCUMENTS

2009/0297936 A1   12/2009   Nemoto et al.
2011/0008665 A1   1/2011    Yoon et al.
(Continued)

FOREIGN PATENT DOCUMENTS

JP   2004-103258 A   4/2004
JP   2007-18917 A    1/2007
(Continued)

OTHER PUBLICATIONS

International Search Report, issued in PCT/KR2016/011076 (PCT/ISA/210), dated Feb. 1, 2017.

*Primary Examiner* — Wojciech Haske
(74) *Attorney, Agent, or Firm* — Birch, Stewart, Kolasch & Birch, LLP

(57) ABSTRACT

Disclosed is a battery module for effectively removing the heat generated from battery cells and minimizing the deformation of the battery cells caused by external impacts, and the battery module includes a battery cell stack having a plurality of battery cells electrically connected to each other, and a module case accommodating the battery cell stack, wherein each battery cell includes a pouch-type case having an accommodation portion so that a rim of the accommodation portion is sealed, an electrode assembly provided in the accommodation portion of the pouch-type case, and an electrode terminal having one end connected to the electrode assembly and the other end protruding out of the pouch-type case, wherein the pouch-type case has a wing portion formed by fusing at least a part of the rim where the electrode terminal is not formed, and wherein a cooling member is provided to at least one space between the wing portion and the accommodation portion.

12 Claims, 3 Drawing Sheets

(51) Int. Cl.
*H01M 2/10* (2006.01)
*H01M 2/02* (2006.01)
*H01M 2/20* (2006.01)
*H01M 10/12* (2006.01)

(52) U.S. Cl.
CPC ....... *H01M 2/0207* (2013.01); *H01M 2/0275* (2013.01); *H01M 2/10* (2013.01); *H01M 2/202* (2013.01); *H01M 10/125* (2013.01); *H01M 10/613* (2015.04); *H01M 10/6552* (2015.04)

(56) References Cited

U.S. PATENT DOCUMENTS

| | | |
|---|---|---|
| 2012/0301771 A1 | 11/2012 | Moser et al. |
| 2015/0064535 A1 | 3/2015 | Seong et al. |

FOREIGN PATENT DOCUMENTS

| | | |
|---|---|---|
| JP | 2009-277561 A | 11/2009 |
| JP | 2013-51099 A | 3/2013 |
| KR | 10-2010-0113996 A | 10/2010 |
| KR | 10-2014-0011439 A | 1/2014 |
| KR | 10-2015-0033177 A | 4/2015 |
| KR | 10-2015-0033179 A | 4/2015 |
| WO | WO 2008/007767 A1 | 1/2008 |
| WO | WO 2012/141191 A1 | 10/2012 |
| WO | WO 2017/217633 A1 | 12/2017 |

BATTERY MODULE

The present application claims priority to Korean Patent Application No. 10-2015-0141756 filed on Oct. 8, 2015 in the Republic of Korea, the disclosures of which are incorporated herein by reference.

TECHNICAL FIELD

The present disclosure relates to a battery module, and more particularly, to a battery module with excellent cooling efficiency.

BACKGROUND ART

A secondary battery, which is easily applied to various product groups and has electrical characteristics such as high energy density, is universally applied not only for a portable device but also for an electric vehicle (EV) or a hybrid electric vehicles (HEV), an energy storage system or the like, which is driven by an electric driving source. The secondary battery is attracting attention as a new environment-friendly energy source for improving energy efficiency since it gives a primary advantage of reducing the use of fossil fuels and also does not generate by-products by the use of energy at all.

A battery pack applied to the electric vehicle or the like has a structure in which a plurality of cell assemblies, each including a plurality of unit cells, are connected in series to obtain a high output. In addition, the unit cell may be repeatedly charged and discharged by means of electrochemical reactions among components, which include a positive electrode current collector, a negative electrode current collector, a separator, an active material, an electrolyte and the like.

Meanwhile, as the need for a large capacity structure is increasing along with the utilization as an energy storage source in recent years, there is a growing demand for a battery pack in which a plurality of battery modules, each including a plurality of secondary batteries connected in series and/or in parallel, are integrated.

Since the battery pack is manufactured so that a plurality of secondary batteries are compactly aggregated in a narrow space, it is important to easily release the heat generated by each secondary battery. Since the charging/discharging process of the secondary battery is performed by electrochemical reactions as described above, the battery may be affected by ambient temperature conditions. For example, if the charging/discharging process is performed under severe temperature conditions such as an extremely low temperature or an extremely high temperature at which the optimum temperature is not maintained, the charging/discharging efficiency of the battery is lowered, and thus it may be difficult to ensure the performance for normal operation.

In addition, due to thermal conduction resistance existing between members used for configuring a cooling structure, the cooling efficiency intended at the designing stage may not be obtained in many cases.

Thus, there is a high need for a battery module that gives a high-output large-capacity power, ensures easy designing, and is excellent in life characteristics, safety and cooling efficiency.

DISCLOSURE

Technical Problem

The present disclosure is designed to solve the problems of the related art, and therefore the present disclosure is directed to providing a battery module which has more excellent structural stability and higher cooling efficiency in comparison to an existing battery module.

Technical Solution

In one aspect of the present disclosure, there is provided a battery module, which includes a battery cell stack having a plurality of battery cells electrically connected to each other, and a module case accommodating the battery cell stack, wherein each battery cell includes a pouch-type case having an accommodation portion so that a rim of the accommodation portion is sealed, an electrode assembly provided in the accommodation portion of the pouch-type case, and an electrode terminal having one end connected to the electrode assembly and the other end protruding out of the pouch-type case, wherein the pouch-type case has a wing portion formed by fusing at least a part of the rim where the electrode terminal is not formed, and wherein a cooling member is provided to at least one space between the wing portion and the accommodation portion.

Preferably, the cooling member may be in contact with an outer side of the accommodation portion.

The cooling member may be attached to sides of the battery cells by means of a thermally conductive adhesive.

Preferably, the cooling member may be in contact with sides of the accommodation portions of two battery cells adjacently stacked in a vertical direction, together.

Preferably, the cooling member may have two inclined surfaces so that each inclined surface is in contact with sides of the accommodation portions of two battery cells stacked in a vertical direction, respectively.

Preferably, the cooling member may have one inclined surface to be in contact with a side of the accommodation portion of one battery cell.

Preferably, at least a part of the battery cells may be configured so that an upper surface and a lower surface of the accommodation portions thereof are in contact with each other.

Preferably, the cooling member may have a width smaller than a width of the wing portion.

The wing portion may be folded upward or downward to wrap the cooling member.

Preferably, the cooling member may have a circular, oval or polygonal sectional shape.

Preferably, the cooling member may be in contact with at least a part of the wing portion.

Preferably, the cooling member may have a tube form with a hollow therein.

Preferably, at least one of both ends of the cooling member may be formed to protrude out of the battery cell.

Advantageous Effects

According to an embodiment of the present disclosure, the heat generated from the battery cells may be effectively removed, and the deformation of the battery cells caused by external impacts may be minimized.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
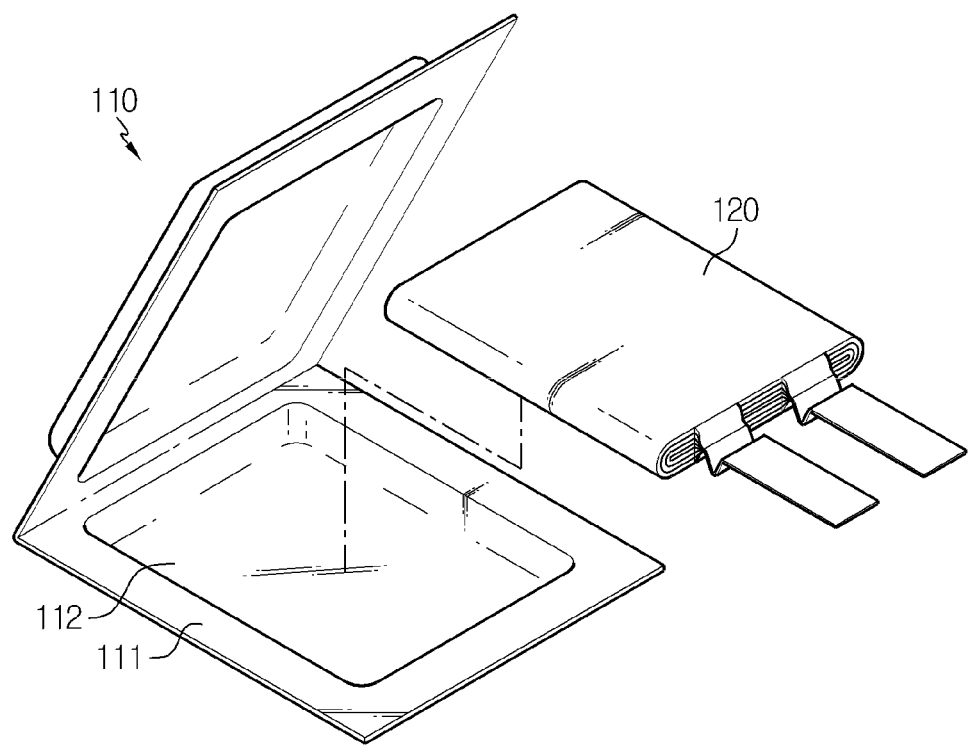
FIG. 1 is a perspective view showing a battery cell according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

A battery module according to an embodiment of the present disclosure includes a battery cell stack having a plurality of battery cells electrically connected to each other, and a module case accommodating the battery cell stack, wherein each battery cell includes a pouch-type case having an accommodation portion so that a rim of the accommodation portion is sealed, an electrode assembly provided in the accommodation portion of the pouch-type case, and an electrode terminal having one end connected to the electrode assembly and the other end protruding out of the pouch-type case, wherein the pouch-type case has a wing portion formed by fusing at least a part of the rim where the electrode terminal is not formed, and wherein a cooling member is provided to at least one space between the wing portion and the accommodation portion.

The electrode assembly includes a positive electrode, a negative electrode, and a separator interposed between the positive electrode and the negative electrode. The electrode assembly is representatively a jelly-roll (a roll type) electrode assembly in which long sheet-like positive and negative electrodes are rolled with a separator being interposed therebetween, a stack-type electrode assembly in which a plurality of positive and negative electrodes cut into a predetermined size are sequentially stacked with a separator being interposed therebetween, a stack/folding-type electrode assembly in which bi-cells or a full cells where positive and negative electrodes of a predetermined unit are stacked with a separator being interposed therebetween are rolled.

The positive electrode includes a positive electrode current collector made of a metal thin plate with excellent conductivity, for example an aluminum (Al) foil, and a positive electrode active material layer coated on both sides thereof. A positive electrode plate have a positive electrode current collector region, namely a positive electrode uncoated portion, where the positive electrode active material layer is not formed, on both sides thereof.

The negative electrode includes a negative electrode current collector made of a conductive metal thin plate, for example a copper (Cu) foil, and a negative electrode active material layer coated on both sides thereof. A negative electrode plate has a negative electrode current collector region, namely a negative electrode uncoated portion, where the negative electrode active material layer is not formed, on both sides thereof.

The separator is located between the positive electrode and the negative electrode and electrically insulates the positive and negative electrodes from each other. The separator may be formed as a porous membrane so that lithium ions pass between the positive electrode and the negative electrode. The separator may be made of a porous film using, for example, polyethylene (PE), polypropylene (PP) or a composite film thereof.

FIG. 1 is a perspective view showing a battery cell according to an embodiment of the present disclosure. Referring to FIG. 1, a pouch-type case 110 includes an accommodation portion 112 for accommodating an electrode assembly 120, and a wing portion 111 formed by sealing a rim of the accommodation portion 112 so that at least a part of the rim where an electrode terminal is not formed is bent.

Figure 2:
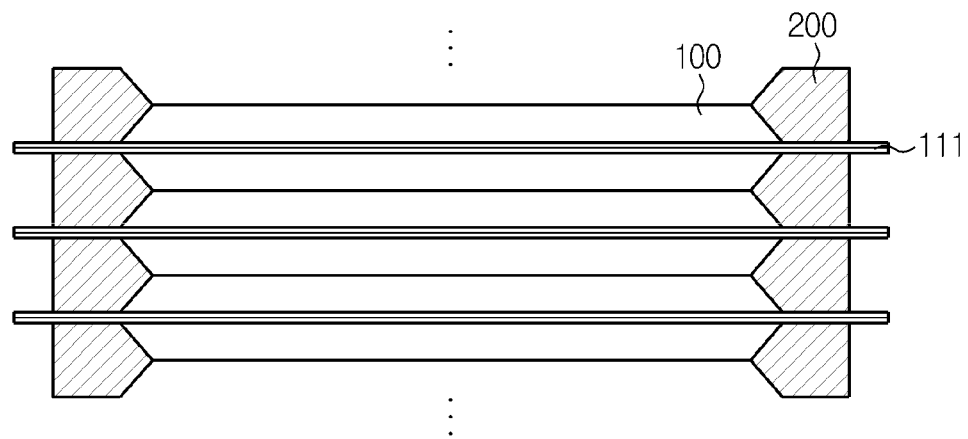
FIG. 2 is a schematic side view showing a battery module having a cooling member according to an embodiment of the present disclosure.

FIG. 2 is a schematic side view showing a battery module having a cooling member according to an embodiment of the present disclosure. Referring to FIG. 2, a plurality of battery cells 100 are stacked, and a cooling member 200 may be provided in a space between the wing portion 111 and the accommodation portion. The cooling member 200 may be included in at least one space between the wing portion 111 and the accommodation portion. The cooling member 200 may be formed of a thermally conductive material with mechanical rigidity, and, for example, may be formed of at least one selected from the group consisting of Al, Cu and W, or their alloys, without being limited thereto.

Figure 3A:
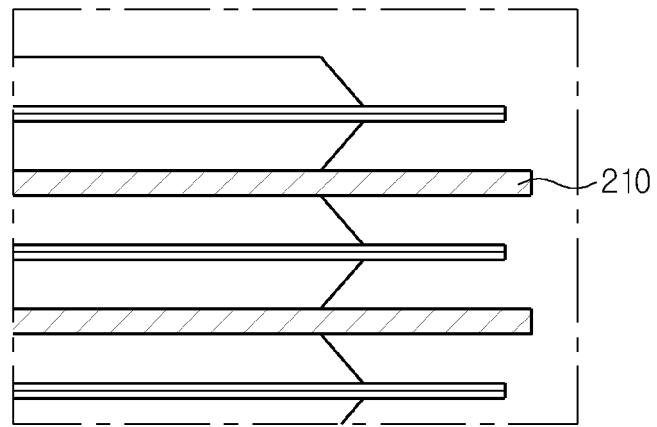
FIGS. 3a and 3b are partial schematic side views showing a battery module of an existing technique.
Figure 3B:
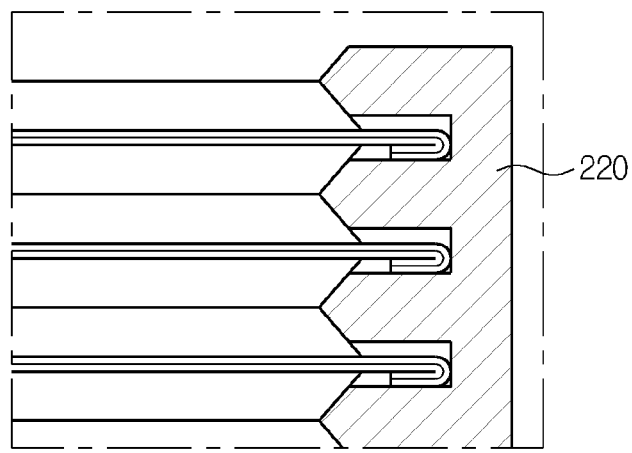

FIGS. 3a and 3b are partial schematic side views showing a battery module of an existing technique. Referring to FIGS. 3a and 3b, a battery module of the existing technique includes a heat dissipation plate 210 between stacked battery cells, or includes an additional cooling unit 220 at a side thereof, which however increases the volume occupied in the battery module and deteriorates the manufacturing processability.

In the present disclosure, since the cooling member is provided to at least one space between the wing portion and the accommodation portion, a heat dissipation plate or an additional cooling unit is not separately required, and it is possible to provide a battery module with excellent structural safety and excellent cooling efficiency.

Figure 4:
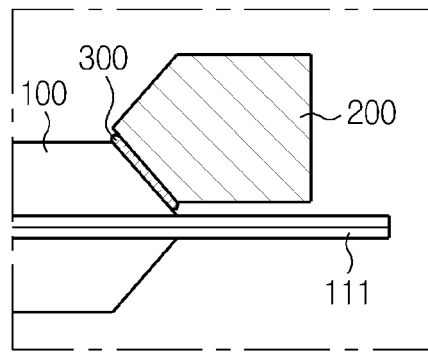
FIG. 4 is a partial schematic side view showing a battery module having a cooling member according to an embodiment of the present disclosure.

FIG. 4 is a partial schematic side view showing a battery module having a cooling member according to an embodiment of the present disclosure. Referring to FIG. 4, the cooling member 200 may be attached to sides of the battery cells 100 by means of a thermally conductive adhesive 300. The thermally conductive adhesive 300 is not specially limited as long as it is capable of easily transferring heat, and the thermally conductive adhesive 300 may be made of a polymer resin such as epoxy, silicone, urethane and acrylate, or a material prepared by dispersing particles of aluminum oxide, boron nitride, zinc oxide, aluminum nitride, carbon-based substance, silver, copper or the like in the polymer resin.

In addition, the cooling member may be in contact with sides of the accommodation portions of two battery cells adjacently stacked in a vertical direction, together.

Moreover, the cooling member may have one or two inclined surfaces so that one inclined surface is in contact with a side of the accommodation portion of one battery cell or two inclined surfaces are in contact with sides of the accommodation portions of two battery cells stacked vertically, respectively.

Figure 5:
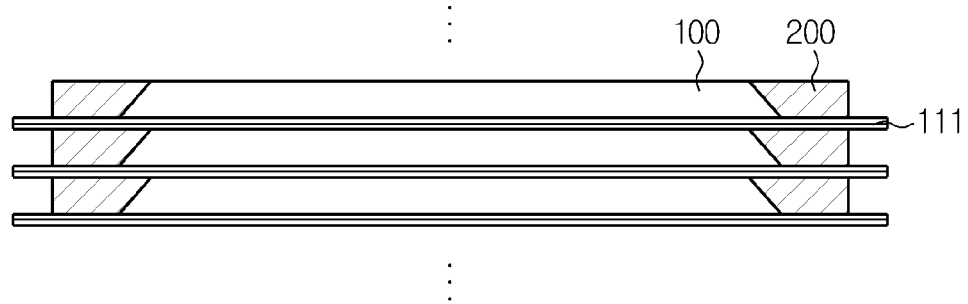
FIGS. 5 to 7 are schematic side views showing a battery module having a cooling member according to an embodiment of the present disclosure.
Figure 6:
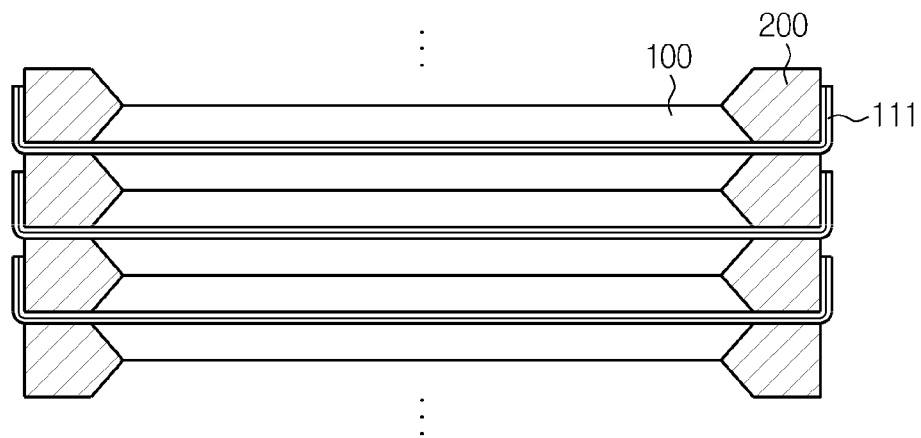
Figure 7:
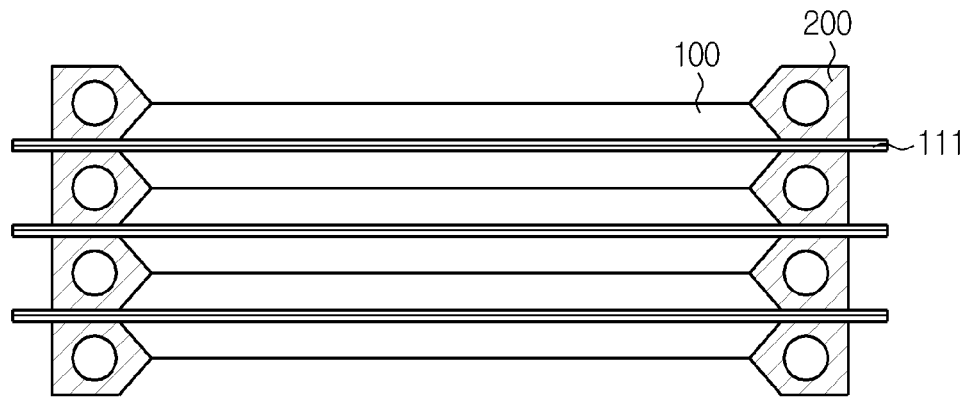

FIGS. 5 to 7 are schematic side views showing a battery module having a cooling member according to an embodiment of the present disclosure.

Referring to FIG. 5, the battery cell 100 has one inclined surface, and the cooling member 200 also has one inclined surface, so that the inclined surfaces may be in contact with the side of the accommodation portion of the battery cell 100.

In addition, the cooling member may have a width smaller than a width of the wing portion, and the wing portion may be folded upward or downward to wrap the cooling member so as to support the battery cells against external impacts and thus improve the structural safety. Referring to FIG. 6, the wing portion 111 may be folded upward to wrap the cooling member 200, thereby supporting each battery cell 100.

Also, the cooling member may have a width of 1 to 20 mm, and the cooling member may have a thickness in the range of 20 to 90% of the thickness of the battery cell and have a length of 60 to 130% of the length of the battery cell.

In addition, the cooling member may have a circular, oval or polygonal sectional shape, without being limited thereto.

Also, the cooling member may be in contact with at least a part of the wing portion.

Referring to FIG. 7, the cooling member 200 may have a tube form with a hollow therein. In addition, the cooling member 200 may be formed so that at least one of both ends thereof protrudes out of the battery cell. If the cooling member has a tube form, the cooling member may serve as a passage through which a refrigerant moves, and the cooling member may further discharge the heat generated from the battery cells to the outside. The refrigerant may be introduced at one side of the cooling member, and the introduced refrigerant may be discharged at the other side thereof.

Although the embodiments of the present disclosure have been described with reference to the accompanying drawings, the present disclosure is not limited to the embodiments, but may be modified into various forms. It will be understood by those skilled in the art that various changes can be made without departing from the scope of the present disclosure. Therefore, it should be understood that the embodiments described above are illustrative in all aspects and not restrictive.

REFERENCE SIGNS

100: battery cell
110: pouch-type case
111: wing portion
112: accommodation portion
120: electrode assembly
200: cooling member
210: heat dissipation plate
220: cooling unit
300: thermally conductive adhesive

What is claimed is:

1. A battery module, which includes a battery cell stack having a plurality of battery cells electrically connected to each other, and a module case accommodating the battery cell stack,
    wherein each battery cell includes a pouch-type case having an accommodation portion so that a rim of the accommodation portion is sealed, an electrode assembly provided in the accommodation portion of the pouch-type case, and an electrode terminal having one end connected to the electrode assembly and the other end protruding out of the pouch-type case,
    wherein the pouch-type case has at least one wing portion, each wing portion being fused to at least a part of the rim where the electrode terminal is not formed,
    wherein the battery module further includes at least one cooling member, each cooling member being provided at a space between the respective wing portion and the accommodation portion,
    wherein each cooling member contacts an outer side of the accommodation portion in a longitudinal direction at a first side of the cooling member, and
    wherein each wing member includes a vertical portion contacting an entire second side of the cooling member, opposite to the first side of the cooling member, the vertical portion extending in a vertical direction perpendicular to the longitudinal direction.

2. The battery module according to claim 1,
    wherein the at least one cooling member is attached to sides of the adjacent battery cells by a thermally conductive adhesive.

3. The battery module according to claim 1,
    wherein the at least one cooling member is in contact with the outer sides of the accommodation portions of two battery cells of said plurality of battery cells adjacently stacked in the vertical direction, together.

4. The battery module according to claim 1,
    wherein each cooling member has two inclined surfaces, and
    wherein each inclined surface of the at least one cooling member is in contact with the outer side of the accommodation portion of a respective battery cell among two battery cells of said plurality of battery cells stacked in the vertical direction, respectively.

5. The battery module according to claim 1,
    wherein each cooling member an inclined surface in contact with the outer side of the accommodation portion of a respective battery cell of the plurality of battery cells.

6. The battery module according to claim 1,
    wherein first and second battery cells of the plurality of battery cells are directly adjacent to one another, and
    wherein the first battery cell includes an accommodation portion having a lower surface in direct contact with an upper surface of an accommodation portion of the second battery cell.

7. The battery module according to claim 1,
    wherein each cooling member has a width smaller than a width of the respective wing portion.

8. The battery module according to claim 7,
    wherein each wing portion is folded upward or downward to wrap the respective cooling member.

9. The battery module according to claim 1,
    wherein each cooling member has a circular, oval or polygonal sectional shape.

10. The battery module according to claim 1,
    wherein each cooling member is in contact with at least a part of the respective wing portion.

11. The battery module according to claim 1,
wherein each cooling member has a tube form with a hollow therein.

12. The battery module according to claim 1,
wherein at least one of both ends of each cooling member is formed to protrude out of the respective battery cell.

* * * * *